United States Patent [19]

Mühlhaüsser et al.

[11] 3,899,723
[45] Aug. 12, 1975

[54] CATHODE FOIL FOR ELECTROLYTIC CONDENSERS

[75] Inventors: Martin Mühlhaüsser, Hohentwie; Christian Roth, Gottmadingen, both of Germany

[73] Assignee: Swiss Aluminium Ltd., Chippis, Switzerland

[22] Filed: Nov. 26, 1973

[21] Appl. No.: 419,146

Related U.S. Application Data

[63] Continuation of Ser. No. 219,112, Jan. 19, 1972, abandoned.

[30] Foreign Application Priority Data

Jan. 21, 1971  Germany.............................. 2102702

[52] U.S. Cl. ..................... 317/230; 29/193; 75/138
[51] Int. Cl.² ..................... H01G 9/00; C22C 21/00
[58] Field of Search ................ 75/138; 29/183, 193; 317/230

[56] References Cited

UNITED STATES PATENTS 2,296,866   9/1942   Moss.................................... 75/138

OTHER PUBLICATIONS

"The Properties of Aluminium and Its Alloys," The Aluminium Development Assn., London 1955, p. 142.
"Webster's Seventh New Collegiate Dictionary," G. & C. Merriam Co., Publishers, p. 323, 1970.

Primary Examiner—L. Dewayne Rutledge
Assistant Examiner—O. F. Crutchfield
Attorney, Agent, or Firm—Ernest F. Marmorek

[57] ABSTRACT

Cathode foil for electrolytic condensers made from an aluminum base alloy containing 0.2 to 2 percent manganese and presenting before etching a tensile strength above 10 kg/mm², preferably from 12 to 18 kg/mm².

2 Claims, No Drawings

CATHODE FOIL FOR ELECTROLYTIC CONDENSERS

This is a continuation of application Ser. No. 219,112, filed Jan. 19, 1972, now abandoned.

An electrolytic condenser consists of an anode (anode foil) having a formed dielectric surface layer, an electrolyte, serving as cathode, and a foil (called cathode foil) which serves as conductor to the electrolyte. For a very long time, electrode foil producers have enlarged the effective surface, and thereby the specific capacity of the foils, by various etching processes thus obtaining the desired capacity value of a condenser with a smaller amount of electrode foil material instead of using a smooth foil. In general electrochemical, rarer chemical and mechanical roughening processes are applied.

As the total capacitance of a condenser is determined by the smallest of the independent capacities since these are connected in series, the cathode foil is generally roughened as well as the anode foil. If the roughness or capacity of the cathode foil is high relative to that of the anode foil the total capacitance of the condenser is practically determined by the anode capacity, or there would be no capacity-reducing influence from the cathode foil capacity.

The conventional cathode foils are usually made of about 99.5 percent pure aluminum. To obtain the highest capacity the cathode foils are not formed after etching like the anode foils so that the necessity to use a high purity and therefore expensive aluminum is eliminated.

Material intended for cathode foil use should be able to be roughened well and, in addition, should have adequate mechanical strength in order to withstand the necessary processing stresses. High demands are also made today in respect to corrosion resistivity, especially since in low voltage condensers, highly aggressive electrolytes are increasingly applied.

The present invention refers to a new cathode foil for electrolytic condensers which can fullfil these requirements better than the foils which have previously been used. According to the invention the cathode foil is made from an aluminum base alloy containing 0.2 to 2.0 percent manganese.

Surprisingly it turned out, that for the same production costs, foils from such an aluminum manganese alloy have considerably higher roughening properties and better tearing strength than foils from 99.5 percent pure aluminum, and that their corrosion resistance is equally as good. Consequently, by using cathode foils from an aluminum manganese alloy an economically and technically superior electrolytic condenser is obtained. No such improvement can be achieved with a manganese content below 0.2 percent. The higher limit of 2.0 percent is a technical (castability, rollability) and economical condition.

EXAMPLE:

Slabs have been prepared by continuous casting from aluminum having a purity of 99.5 percent with not more than 0.3 percent of any single element impurity, and other slabs from aluminum of the same purity grade but with an addition of 1.0 percent manganese. Both charges were manufactured to cathode foils under equal conditions. The billets were first heated and then hotrolled to a thickness of 6.0 mm. The ensuing strips were cold-rolled to a thickness of 0.050 mm and then electrolytically etched. The etching electrolyte consisted of a 20 percent saline solution at a temperature of 90°C; the loading was 30 Coulomb/cm$^2$. After the etching process the foils were thoroughly washed in distilled water.

The tensile strength and capacity of the foils were then determined. Capacity measurement was carried out according to German norm DIN 41330.

The results in the following table show the considerably better values of the foil made from aluminum-manganese alloy:

|  | Capacity ($\mu$F/cm$^2$) 0 Volt | 10 Volt | Tensile Strength (kp/10mm Strip width) |
|---|---|---|---|
| Al + 1.0% Mn | 160 | 37 | 3.5 – 3.8 |
| Al 99.5% | 110 | 28 | 2.2 – 2.5 |

It is preferred to use an aluminium manganese foil with a tensile strength of more than 10 kp/mm$^2$ before etching; advantageously, between 12 and 18 kp/mm$^2$. When manufacturing the foils these strength values can be attained by such known means as soft annealing after cold rolling or by an intermediate anneal between two cold rolling passes. Foil with higher strength, as they are after cold rolling, without annealing, render the same capacity values but are unsuitable for further processing and have to be softened by annealing after being etched. This leads to a decrease in capacity.

What is claimed is:

1. In an electrolytic condenser, a foil strip cathode electrode comprising an alloy of 0.2 to 2.0 percent by weight of manganese and the balance of the alloy being commercially pure aluminum having a purity of from 99.0 to 99.8 percent by weight, said electrode having a thickness from 0.0043 to 0.1520 millimeters.

2. A foil strip cathode electrode for use as a cathode foil of an electrolytic condenser, comprising an alloy of 0.2 to 2.0 percent by weight of manganese and the balance of the alloy being commercially pure aluminum having a purity of from 99.0 to 99.8 percent by weight, said foil strip cathode electrode having a thickness from 0.0043 to 0.1520 millimeters.

* * * * *